United States Patent
Taguma et al.

(10) Patent No.: US 10,549,811 B2
(45) Date of Patent: Feb. 4, 2020

(54) FRONT WHEEL SUSPENSION DEVICE FOR SADDLE-RIDE TYPE VEHICLE

(71) Applicant: HONDA MOTOR CO., LTD., Tokyo (JP)

(72) Inventors: Takahiro Taguma, Wako (JP); Hirotaka Nagatani, Wako (JP); Takayuki Kitayama, Wako (JP); Konomu Hoshi, Wako (JP); Hideki Inaizumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 361 days.

(21) Appl. No.: 15/056,359

(22) Filed: Feb. 29, 2016

(65) Prior Publication Data

US 2016/0280308 A1    Sep. 29, 2016

(30) Foreign Application Priority Data

Mar. 25, 2015  (JP) ................................. 2015-062447

(51) Int. Cl.
*B62K 21/08* (2006.01)
*B62K 21/02* (2006.01)
*B62K 21/18* (2006.01)
*B62K 25/04* (2006.01)

(52) U.S. Cl.
CPC .............. *B62K 21/02* (2013.01); *B62K 21/18* (2013.01); *B62K 25/04* (2013.01)

(58) Field of Classification Search
CPC ........ B62K 25/24; B62K 25/04; B62K 21/02; B62K 21/18
See application file for complete search history.

(56) References Cited

U.S. PATENT DOCUMENTS

| 414,048 | A | * | 10/1889 | Hunter | ...................... | B62L 3/00 |
| | | | | | | 280/264 |
| 4,179,135 | A | * | 12/1979 | Slater | ..................... | B62K 25/24 |
| | | | | | | 280/276 |

(Continued)

FOREIGN PATENT DOCUMENTS

| GB | 2121364 | A | * | 12/1983 | ............. | B62K 25/24 |
| GB | 2207645 | A | * | 2/1989 | ............. | B62K 25/24 |

(Continued)

*Primary Examiner* — Tony H Winner
(74) *Attorney, Agent, or Firm* — Birch, Stewart, Kolasch & Birch, LLP (57) ABSTRACT

A front wheel suspension device for a saddle-ride type vehicle, includes a front fork for supporting a front wheel with a steering member that is rotated about a rotational axis in accordance with operation of a handlebar. A link member is composed of an upper link rockably connected to the steering member and a lower link rockably connected to the upper link and the front fork. A swing arm includes upper and lower arms. A supporting member forms a steering axis and rockably supports front ends of the upper and lower arms. The supporting member is of a cylindrical shape, and supports the front fork on the inside in the radial direction of the supporting member such that the front fork is rotatable about the steering axis. The length of the swing arm is ensured while increasing flexibility in the layout of the swing arm.

20 Claims, 3 Drawing Sheets

(56) References Cited

U.S. PATENT DOCUMENTS

| | | | | |
|---|---|---|---|---|
| 8,162,342 B2* | 4/2012 | Chen | .................... | B62K 25/24 |
| | | | | 280/276 |
| 2010/0096207 A1* | 4/2010 | Nagao | .................... | B62K 25/24 |
| | | | | 180/223 |
| 2011/0012321 A1* | 1/2011 | Chen | .................... | B62K 25/24 |
| | | | | 280/124.13 |
| 2015/0274250 A1* | 10/2015 | Kuwabara | .............. | B62K 25/24 |
| | | | | 280/276 |
| 2015/0307152 A1* | 10/2015 | Van Steenwyk | ....... | B60G 3/185 |
| | | | | 280/276 |
| 2015/0307153 A1* | 10/2015 | Loni | .................... | B62K 21/22 |
| | | | | 280/276 |

FOREIGN PATENT DOCUMENTS

| | | |
|---|---|---|
| JP | 63-156891 U | 10/1988 |
| JP | 04-169386 A | 6/1992 |
| JP | 2011-143851 A | 7/2011 |

* cited by examiner

FRONT WHEEL SUSPENSION DEVICE FOR SADDLE-RIDE TYPE VEHICLE

CROSS-REFERENCE TO RELATED APPLICATIONS

The present application claims priority under 35 USC 119 to Japanese Patent Application No. 2015-062447 filed Mar. 25, 2015 the entire contents of which are hereby incorporated by reference.

BACKGROUND OF THE INVENTION

1. Field of the Invention

The present invention relates to a front wheel suspension device for a saddle-ride type vehicle.

2. Description of Background Art

A front wheel suspension devices for saddle-ride type vehicles is known. See, for example, JP-A No. H4-169386. This front wheel suspension device includes a front fork for supporting a front wheel at a lower end thereof; a link member having upper and lower links, the upper and lower links coupling a handlebar and the front fork; and a swing arm that has upper and lower arms extending in the longitudinal direction of the vehicle and provided in a vertically rockable manner. In JP-A No. H4-169386, the operation (rotation) of the handlebar is transmitted through the upper and lower links to the front fork.

However, since the front fork is supported on the outside in the radial direction of the columnar supporting member, there has been a problem wherein the swing arm and the front fork become likely to interfere with each other, resulting in a difficulty in the layout of the swing arm. Also, since the swing arm is disposed at a position rearwardly of the supporting member or overlapping the central axis of the supporting member in a side view, there has been a problem wherein it is difficult to ensure the length of the swing arm.

SUMMARY AND OBJECTS OF THE INVENTION

Accordingly, an object of an embodiment of the present invention is to provide a front wheel suspension device for a saddle-ride type vehicle wherein a handlebar and a front fork are coupled through a link member. Thus, the length of a swing arm is ensured while increasing the flexibility in the layout of the swing arm.

According to an embodiment of the present invention, a front wheel suspension device (1) for a saddle-ride type vehicle includes a front fork (10) having a lower end (12b) supporting a front wheel (9); a steering member (25) that is rotatably supported by a body frame (2), and rotated about a rotational axis (C1) in accordance with operation of a handlebar (20); a link member (30) that is composed of an upper link (31) and a lower link (32), the upper link (31) having one end (31a) rockably connected to the steering member (25), the lower link (32) having an upper portion (32a) rockably connected to the other end (31b) of the upper link (31) and a lower portion (32b) rockably connected to an upper end (11a) of the front fork (10). A swing arm (40) includes upper and lower arms (41, 42) extending in the longitudinal direction of the vehicle and provided in a vertically rockable manner. A supporting member (15) forms a steering axis (C2) of the front wheel (9) and rockably supports front ends (41a, 42a) of the upper and lower arms (41, 42), wherein the supporting member (15) is of cylindrical shape, and supports the front fork (10) on the inside in the radial direction of the supporting member (15) such that the front fork (10) is rotatable about the steering axis (C2).

According to an embodiment of the present invention, the supporting member (15) is formed with upper and lower connecting portions (15c, 15d) rockably connected to the front ends (41a, 42a) of the upper and lower arms (41, 42), and the upper and lower connecting portions (15c, 15d) are arranged further toward the front of the vehicle than the steering axis (C2) in a side view.

According to an embodiment of the present invention, the steering axis (C2) of the front wheel (9) and the rotational axis (C1) are offset longitudinally with respect to each other in a side view.

According to an embodiment of the present invention, the upper and lower arms (41, 42) have rear ends (41b, 42b) rockably connected to the body frame (2). In addition, the supporting member (15) is rockably connected to the front ends (41a, 42a) of the upper and lower arms (41, 42).

According to an embodiment of the present invention, the front and rear ends (41a, 41b) of the upper arm (41) are adjacent to the steering axis (C2) so as to sandwich the steering axis (C2) therebetween.

According to an embodiment of the present invention, the front wheel suspension device (1) further includes a shock absorber member (50) having an upper end (50a) rockably connected to the body frame (2) and a lower end (50b) rockably connected to the lower arm (42), wherein the upper end (50a) of the shock absorber member (50) is covered with the body frame (2) in a side view. The shock absorber member (50) has a central axis (C3) disposed further toward the rear of the vehicle than the rear end (41b) of the upper arm (41) in a side view.

According to an embodiment of the present invention, the supporting member is of cylindrical shape, and supports the front fork on the inside in the radial direction of the supporting member such that the front fork is rotatable about the steering axis. Thus, the swing arm and the front fork become less likely to interfere with each other, as compared with the case where the front fork is supported on the outside in the radial direction of the columnar supporting member, resulting in easy layout of the swing arm. Furthermore, the length of the swing arm is more easily ensured as compared with the case where the front fork is supported on the outside in the radial direction of the columnar supporting member. It is therefore possible to ensure the length of the swing arm while improving flexibility in the layout of the swing arm.

According to an embodiment of the present invention, the supporting member is formed with the upper and lower connecting portions rockably connected to the front ends of the upper and lower arms. The upper and lower connecting portions of the supporting member are arranged further toward the front of the vehicle than the steering axis in a side view. Thus, it is possible to ensure the length of the upper and lower arms without complicating the supporting member.

According to an embodiment of the present invention, a steering axis of the front wheel and the rotational axis are offset longitudinally with respect to each other in a side view. Thus, the protrusion of the link member toward the front of the vehicle can be suppressed, thereby allowing a compact steering system.

According to an embodiment of the present invention, the upper and lower arms have rear ends rockably connected to the body frame, and the supporting member is rockably connected to front ends of the upper and lower arms, wherein it is possible to lower the height of the handlebar while making the layout of the handlebar compact.

According to an embodiment of the present invention, the front and rear ends of the upper arm are adjacent to the steering axis so as to sandwich the steering axis therebetween. Thus, it is possible to ensure the length of the swing arm while bringing the body frame and the steering axis close to each other. Therefore, the vehicle can be made compact.

According to an embodiment of the present invention, the upper end of the shock absorber member is covered with the body frame in a side view, and the shock absorber member has a central axis, the central axis being disposed further toward the rear of the vehicle than the rear end of the upper arm in a side view. Thus, since the shock absorber member is disposed rearwardly of the upper arm, the upper end of the shock absorber member is concealed behind the body frame in a side view and becomes less likely to be visible from the outside. Thus, the appearance in the quality is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described with reference to the accompanying drawings. It is to be noted that references to directions, such as front, rear, left, and right, in the following description are made with reference to a vehicle to be described below, unless otherwise stated. It is also to be noted that arrow FR indicating the front of the vehicle, arrow LH indicating the left of the vehicle, and arrow UP indicating the upside of the vehicle are shown in appropriate positions in the drawings to be used in the following description.

Figure 1:
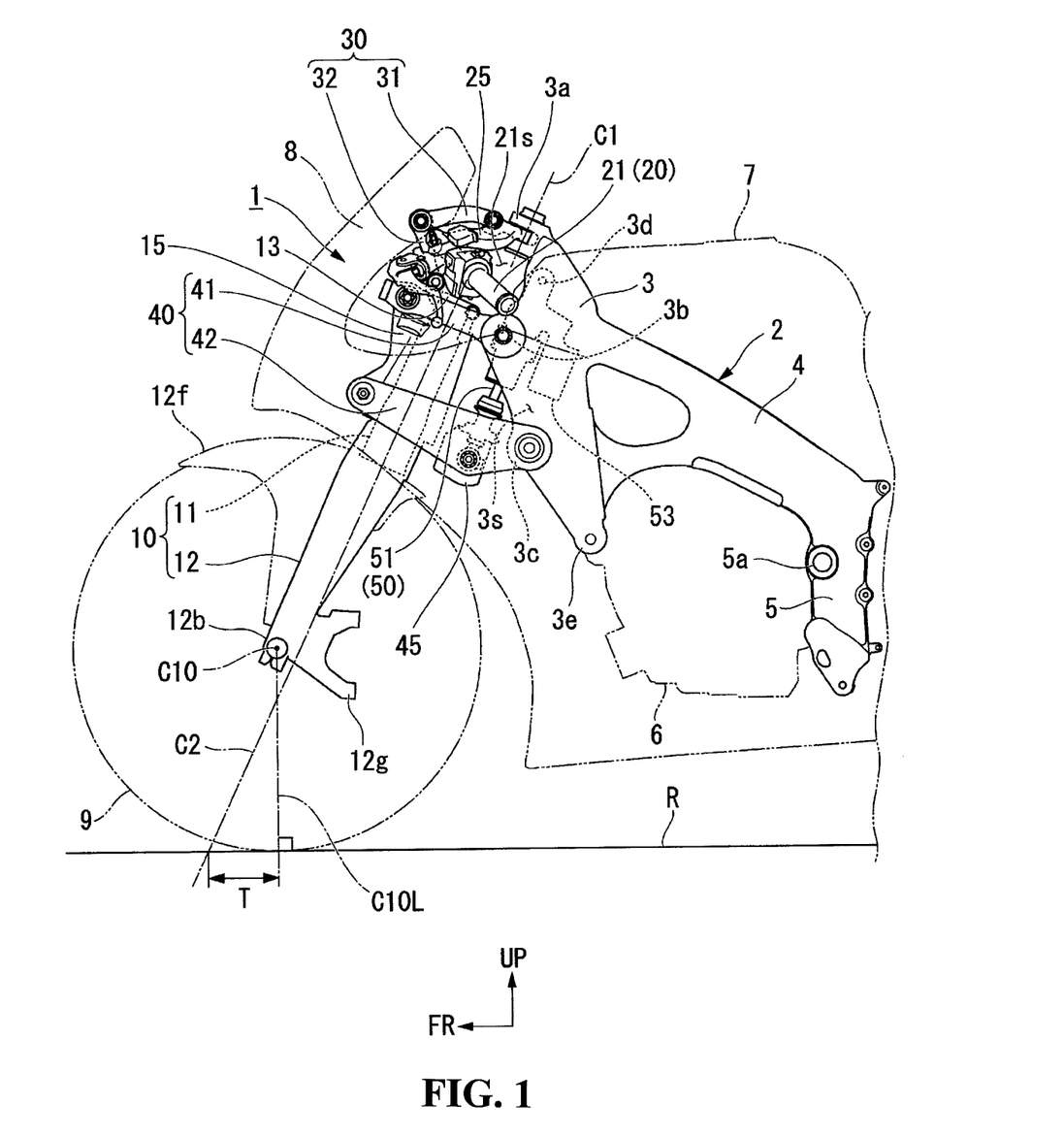
FIG. 1 is a left side view of a front portion of the vehicle body of a motorcycle according to an embodiment of the present invention.

FIG. 1 shows a front portion of the vehicle body of a motorcycle as an example of a saddle-ride type vehicle. Referring to FIG. 1, a body frame 2 of the motorcycle has a front block 3 at a front end thereof, the front block 3 supporting a front wheel suspension device 1.

Figure 2:
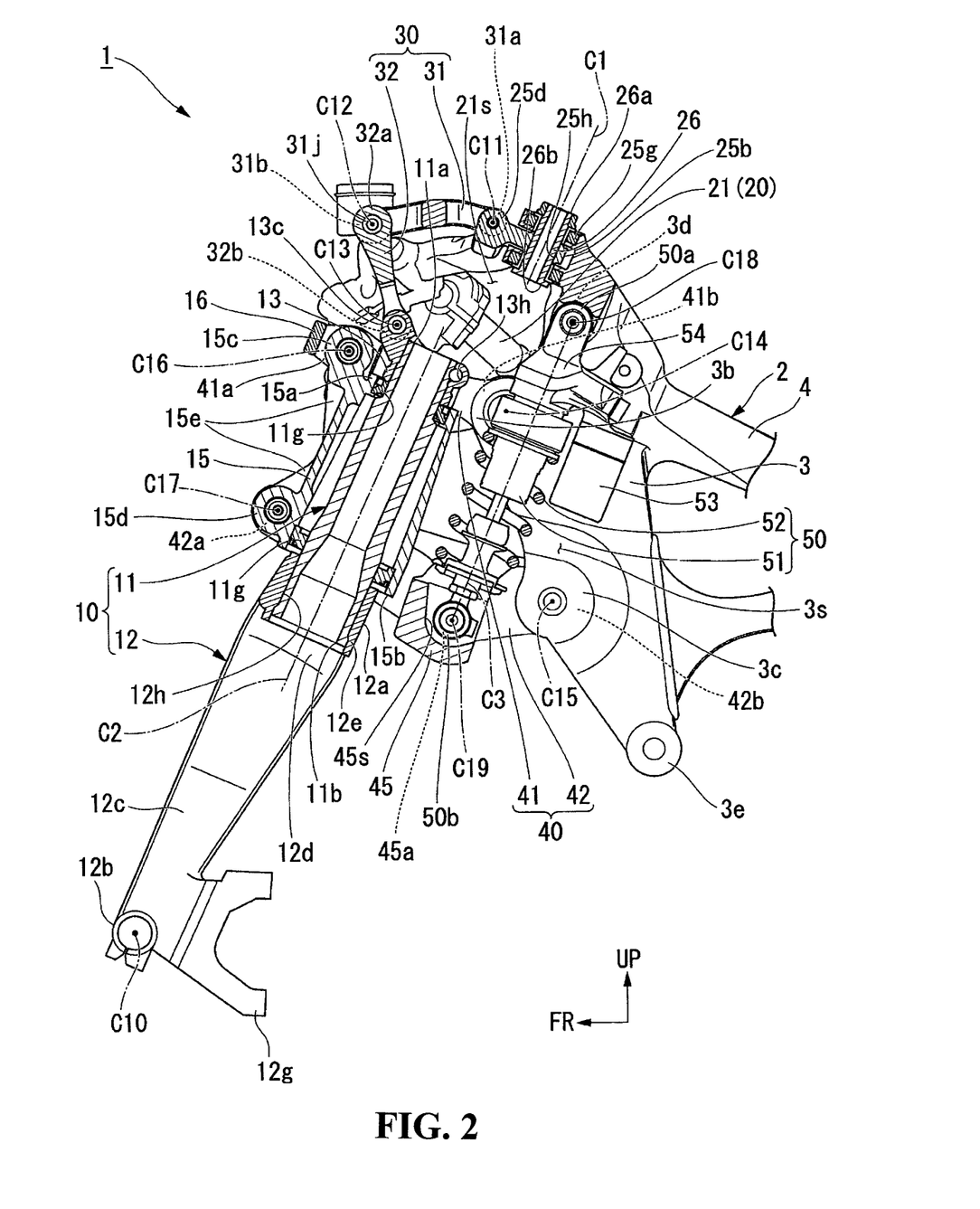
FIG. 2 is a sectional view including: a section taken along a rotational axis of a front wheel suspension device of the motorcycle; a section taken along a steering axis; and a section taken along a stroke axis.

A pair of left and right main frames 4 extend downwardly toward the rear at the rear of the front block 3. In FIG. 2, a left main frame 4L and a right main frame 4R are provided. The left and right main frames 4 are connected to a pivot frame 5 for supporting a rear wheel suspension device not shown in the figures. An engine 6 is mounted below the front block 3 and the left and right main frames 4. A fuel tank 7 is disposed on the front block 3 and the left and right main frames 4. The front portion of the vehicle body of the motorcycle is covered by a front cowl 8 made of a synthetic resin.

Figure 3:
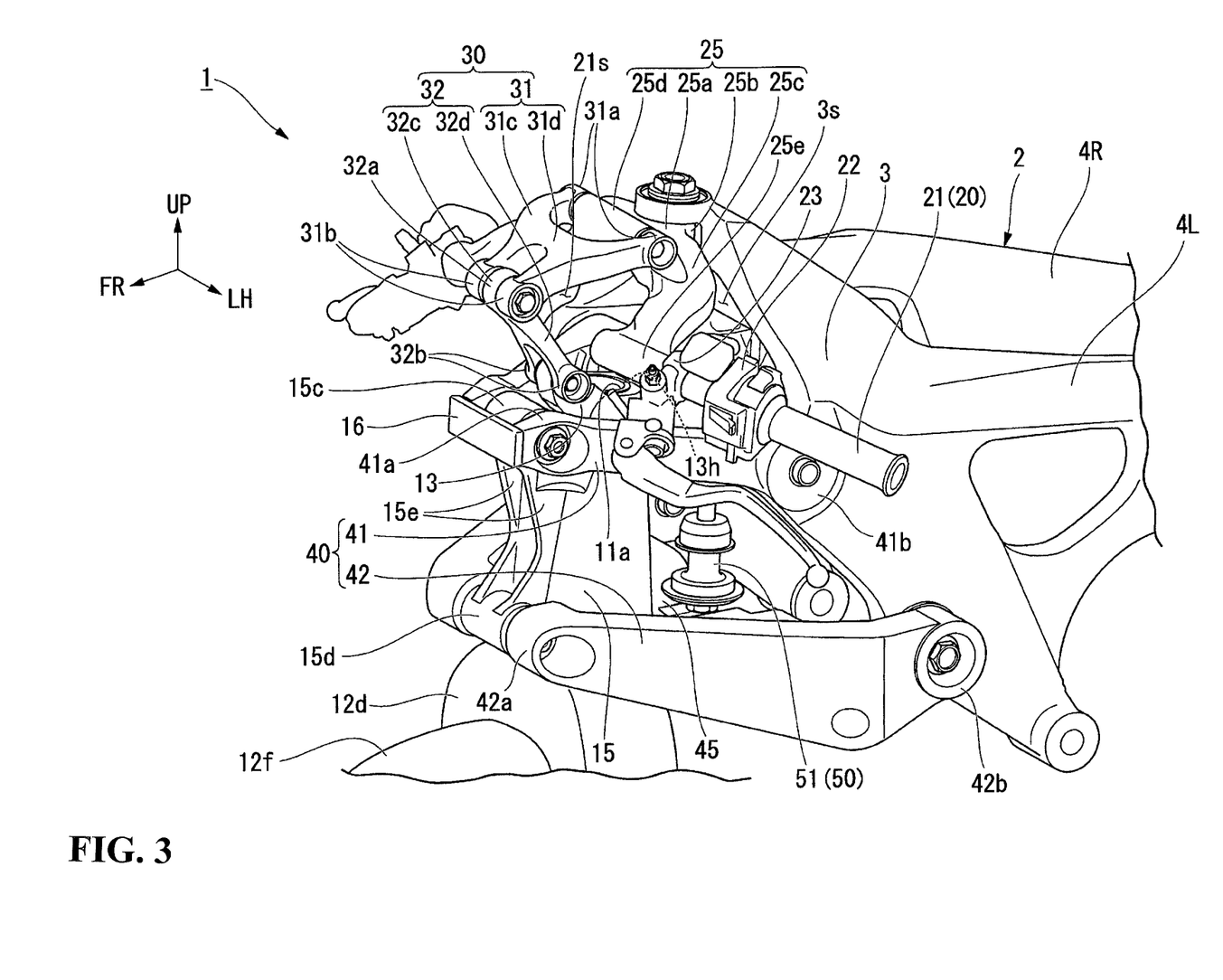
FIG. 3 is a perspective view of the front wheel suspension device as viewed from the upper-left front.

Referring to FIG. 2 and FIG. 3, the front block 3 has a flat shape with a reduced front-rear width in a side view, and has a gate shape (inverted V-shape) opening downwardly with a smaller left-right width toward the upper side in front view. A lower open portion $3s$ of the gate shape of the front block 3 is provided.

An upper supporting portion $3a$ supporting a steering member 25 is formed at an upper end of the front block 3. An upper connecting portion $3b$ to which a rear end $41b$ of an upper arm 41 is connected is formed at an upper portion (in the vicinity of the vertical center) of the front block 3. A lower connecting portion $3c$ to which a rear end $42b$ of a lower arm 42 is connected is formed at a lower portion (below the upper connecting portion $3b$, in the vicinity of the vertical center) of the front block 3. A shock absorber connecting portion $3d$ to which an upper end $50a$ of a shock absorber member 50 is connected is formed between the upper supporting portion $3a$ and the upper connecting portion $3b$ of the front block 3. Lower supporting portions $3e$ supporting the left and right sides of a front portion of the engine 6 are formed at a lower end of the front block 3. It should be noted that the left and right sides of a rear portion of the engine 6 are supported by supporting portions $5a$ of the pivot frame 5.

The front wheel suspension device 1 includes a front fork 10 that has a lower end $12b$ supporting a front wheel 9; the steering member 25 that is rotatably supported by the upper supporting portion $3a$ of the front block 3, and rotated about a rotational axis C1 in accordance with the operation of the handlebar 20; a link member 30 that has upper and lower links 31 and 32 coupled between the steering member 25 and the front fork 10; a swing arm 40 that has the upper and lower arms 41 and 42 extending in the longitudinal direction of the vehicle and provided in a vertically rockable manner; a supporting member 15 that forms a steering axis C2 of the front wheel 9 and is rockably supported by front ends $41a$ and $42a$ of the upper and lower arms 41 and 42; and the shock absorber member 50 that provides a shock absorbing action by causing a lower end $50b$ to perform a stroke in accordance with the rocking of the lower arm 42. The rotational movement about the rotational axis C1 and the turning of the front wheel 9, which are caused in accordance with the operation of the handlebar 20, are interlocked through the steering member 25, the link member 30, and the front fork 10.

The rotational axis C1 is referred to as the center of rotation of the steering member 25 rotated in accordance with the operation of the handlebar 20, which coincides with the central axis of the cylindrical upper supporting portion $3a$ of the front block 3. The steering axis C2 (turning axis) is referred to as the center of rotation of the front fork 10 rotated in accordance with the operation of the handlebar 20, which coincides with the central axis of the cylindrical supporting member 15. The angle of the steering axis C2 with respect to the vertical serves as a "caster angle." The steering axis C2 is offset (separate) frontward from the rotational axis C1 in a side view. The steering axis C2 and the rotational axis C1 are substantially parallel to each other.

The front fork 10 integrally has a shaft portion 11 extending along the steering axis C2 and a fork member 12. The fork member 12 integrally has a pair of left and right arm portions 12c extending vertically and a cross member 12d coupling upper ends of the left and right arm portions 12c to each other. The left and right arm portions 12c are arranged on either side of the front wheel 9. The cross member 12d is curved inwardly in the vehicle width direction along the tread surface in an upper end position of the front wheel 9, and disposed between the upper ends of the left and right arm portions 12c. The cross member 12d has left and right ends joined to the upper ends of the left and right arm portions 12c. The elements of the front fork 10 are components made of, for example, aluminum, and are integrally joined to each other by welding.

The shaft portion 11 of the front fork 10 is supported rotatably about the steering axis C2 by the supporting member 15 on the inside in the radial direction of the cylindrical supporting member 15. The front fork 10 has an upper end 11a connected to a turning member 13, and a lower end 12b supporting the axle (front wheel axle) of the front wheel 9.

A journaling portion 12e to which a lower end 11b of the shaft portion 11 is connected is formed at an upper end of the cross member 12d. An insertion hole 12h opening in a direction in which the shaft portion 11 extends is formed in the journaling portion 12e of the cross member 12d. The shaft portion 11 increases gradually in diameter in such a manner that the outer diameter increases toward the lower side, and has the maximum diameter at the lower end 11b thereof. The shaft portion 11 is inserted into the insertion hole 12h from the upper end 11a, and, with the lower end 11b of the shaft portion 11 located in the insertion hole 12h, the lower end 11b of the shaft portion 11 and the journaling portion 12e are joined together by welding, thereby fixing the upper end of the cross member 12d to the lower end 11b of the shaft portion 11.

The front wheel axle is connected to the lower ends 12b of the left and right arm portions 12c. For example, through ball bearings not shown in the figures, both ends in the vehicle width direction of the front wheel axle are fixed to the lower end 12b of the front fork 10, and the wheel of the front wheel 9 is rotatably supported in the center in the vehicle width direction of the front wheel axle. A front fender 12f is supported on the cross member 12d of the front fork 10 through a bolt not shown in the figures.

A caliper bracket 12g supports a brake caliper not shown in the figures. Furthermore, in the figures, a central axis C10 of the front wheel axle is provided with a perpendicular C10L from the central axis C10 to the road surface R and a trail T.

The upper supporting portion 3a of the front block 3 is provided in a bifurcated manner so as to project forward and upward from the upper end of the front block 3 in a side view. The upper supporting portion 3a is integrally provided at the upper end of the front block 3 made of, for example, aluminum. The upper supporting portion 3a rotatably (steerably) supports the steering member 25.

More specifically, the upper supporting portion 3a has a cylindrical shaft portion 26 (for example, a collar), with the rotational axis C1 as a central axis, inserted into the inner circumference thereof, and supports a journaling portion 25b of the steering member 25 supporting the shaft portion 26 so that the journaling portion 25b is rotatable (steerable) about the rotational axis C1. The upper supporting portion 3a sandwiches a main body portion 25a of the steering member 25 from both the upper and lower sides using the above-described bifurcation. A lower end 26b of the shaft portion 26 protrudes downwardly from the upper supporting portion 3a and has a diameter greater than the inner diameter of the opening of the upper supporting portion 3a. An upper end 26a of the shaft portion 26 protrudes upwardly from the upper supporting portion 3a, and a fastening member, such as a nut, is fixed to this protruding portion. Thus, the movement of the shaft portion 26 in a direction along the rotational axis C1 is restricted.

A ball bearing 25g is retained in the inner circumference of the upper supporting portion 3a.

The steering member 25 forms a U-shape protruding rearward as viewed from a direction along the rotational axis C1. The steering member 25 integrally has the main body portion 25a; the journaling portion 25b that is continuous with the rear end of the main body portion 25a and has an insertion hole 25h (see FIG. 2) with the rotational axis C1 as a central axis; a pair of left and right extending portions 25c that are continuous with both the left and right ends of the main body portion 25a, and extend forward at a gentle incline so as to be located on the outer side in the vehicle width direction toward the front; and a connecting portion 25d that protrudes upwardly from the top surface of the main body portion 25a and is connected to a rear end 31a (one end) of the upper link 31.

The handlebar 20 is fixed to front ends 25e of the left and right extending portions 25c of the steering member 25. The handlebar 20 is formed integrally with the steering member 25. The handlebar 20 and the steering member 25 are components made of, for example, aluminum, and are joined to each other by welding. For example, the handlebar 20 has separate handlebars separated into left and right in the vehicle width direction, the inside portions in the vehicle width direction thereof being joined by welding to the front ends 25e of the left and right extending portions 25c of the steering member 25. The arrangement may be such that insertion holes along the vehicle width direction are formed in the front ends 25e of the left and right extending portions 25c of the steering member 25, and the inside portions in the vehicle width direction of the left and right separate handlebars are press-fitted into the insertion holes, thereby forming the handlebar 20 and the steering member 25 integrally with each other. Alternatively, the arrangement may be such that a single handlebar formed continuously without being separated into left and right in the vehicle width direction is installed inside the steering member 25, thereby forming the handlebar and the steering member 25 integrally with each other. The journaling portion 25b of the steering member 25 is rotatably supported by the upper supporting portion 3a, thereby making the steering member 25 rotatable (steerable) about the rotational axis C1 in accordance with the operation of the handlebar 20.

A handlebar grip portion 21 serving as a gripping portion allowing an occupant to grip is formed at both ends in the vehicle width direction of the handlebar 20. The handlebar grip portion 21, in a side view, is disposed between the upper and lower links 31 and 32. More specifically, the handlebar grip portion 21, in a side view, is disposed in a space 21s that is surrounded by the upper and lower links 31 and 32, the front block 3, and the turning member 13.

In FIG. 3 a switch box 22 includes switches, such as a dimmer switch and an indicator switch. Also, in FIG. 3 a master cylinder 23 is coupled to a brake lever.

The supporting member 15 is provided so as to be separated frontward from the rotational axis C1. More specifically, the supporting member 15 is of cylindrical shape, and provided in front of the front block 3 so as to be inclined rearwardly with respect to the upright. The supporting member 15 supports the shaft portion 11 of the front fork 10 on the inside in the radial direction thereof such that the shaft portion 11 is rotatable (steerable) about the steering axis C2. The upper end 11a of the shaft portion 11 protrudes further upwardly than an upper end 15a of the supporting member 15. It should be noted that the shaft portion 11 and the supporting member 15 have the steering axis C2 as a central axis. Ball bearings 11g are retained in the inner circumference of the upper and lower ends 15a and 15b of the supporting member 15.

An upper connecting portion 15c to which the front end 41a of the upper arm 41 is connected is formed at a front upper portion of the supporting member 15 so as to protrude forward and upwardly. A lower connecting portion 15d to which the front end 42a of the lower arm 42 is connected is formed at a front lower portion of the supporting member 15 so as to protrude forward and upwardly. The upper and lower connecting portions 15c and 15d are arranged forward of the steering axis C2 in a side view. A rib 15e for reinforcing the upper and lower connecting portions 15c and 15d is formed on the front surface of the supporting member 15. The rib 15e, in a side view, has a curved shape protruding rearward and downward, and extends vertically in such a manner that the rib height decreases with approach towards the vertical center.

The turning member 13 is supported by the upper end 11a of the shaft portion 11 above the upper end 15a of the supporting member 15. A connecting portion 13c to which a lower end 32b of the lower link 32 is connected is formed at a front end of the turning member 13 so as to protrude forward and upwardly.

The turning member 13 has a shape opening rearwardly as viewed from a direction along the steering axis C2. An insertion hole 13h (see FIG. 2) opening in the vehicle width direction is formed in a rear lower end of the turning member 13. For example, the turning member 13 is inserted into the upper end 11a of the shaft portion 11, and in this state, a bolt is threaded into a nut through the insertion hole 13h and tightened, thereby fastening the turning member 13 to the upper end 11a of the shaft portion 11. The turning member 13 is rotatable (steerable) about the steering axis C2 integrally with the front fork 10 in accordance with the operation of the handlebar 20.

The link member 30 has an L-shape protruding forward and upward in a side view. The link member 30 is composed of the upper link 31 that has the rear end 31a (one end) rockably connected to the steering member 25 and the lower link 32 that has an upper end 32a (upper portion) rockably connected to a front end 31b (the other end) of the upper link 31, and the lower end 32b (lower portion) rockably connected to the upper end 11a of the front fork 10.

The upper link 31 has a H-shape in front view, the rear end of which has a rearward opening with a width equivalent to the left-right width of the connecting portion 25d of the steering member 25, and the front end of which has a forward opening with a width equivalent to the left-right width of the upper end 32a of the lower link 32. The upper link 31, in a side view, has an arcuate shape that is gently curved while protruding upwardly. The upper link 31 integrally has a pair of left and right extending portions 31c that extend longitudinally in a spaced relation to each other in the vehicle width direction and a coupling portion 31d that extends between the left and right extending portions 31c.

The rear ends 31a of the left and right extending portions 31c of the upper link 31 are rockably connected to the connecting portion 25d of the steering member 25 through a coupling shaft disposed along the vehicle width direction. In FIG. 2, a central axis C11 of the coupling shaft couples the rear ends 31a of the left and right extending portions 31c and the connecting portion 25d of the steering member 25. For example, the rear ends 31a of the left and right extending portions 31c of the upper link 31 are supported rotatably about the central axis C11 by the connecting portion 25d of the steering member 25 through a ball bearing, not shown in the figures, or the like.

The lower link 32 is of inverted Y-shape in front view, the upper end of which has a left-right width equivalent to the distance between the front ends 31b of the left and right extending portions 31c of the upper link 31, and the lower end of which has a downward opening with a width equivalent to the left-right width of the connecting portion 13c of the turning member 13. The lower link 32, in a side view, extends vertically so as to be gently inclined forward to the upright. The lower link 32 integrally has a main body portion 32c that extends vertically; and a pair of left and right extending portions 32d that branch from the lower end of the main body portion 32c and extend downwardly.

The upper end 32a of the main body portion 32c of the lower link 32 is rockably connected to the front ends 31b of the left and right extending portions 31c of the upper link 31 through a coupling shaft disposed along the vehicle width direction. In FIG. 2, a central axis C12 of the coupling shaft couples the upper end 32a of the main body portion 32c of the lower link 32 and the front ends 31b of the left and right extending portions 31c of the upper link 31. For example, the upper end 32a of the main body portion 32c of the lower link 32 is supported rotatably about the central axis C12 by the front ends 31b of the left and right extending portions 31c of the upper link 31 through a ball joint 31j or the like.

The lower ends 32b of the left and right extending portions 32d of the lower link 32 are rockably connected to the connecting portion 13c of the turning member 13 through a coupling shaft disposed along the vehicle width direction. In FIG. 2, a central axis C13 of the coupling shaft couples the lower ends 32b of the left and right extending portions 32d of the lower link 32 and the connecting portion 13c of the turning member 13. For example, the lower ends 32b of the left and right extending portions 32d of the lower link 32 are supported rotatably about the central axis C13 by the connecting portion 13c of the turning member 13 through a ball bearing, not shown in the figures, or the like.

The swing arm 40 has the pair of left and right upper arms 41 and the pair of left and right lower arms 42, which extend in the longitudinal direction of the vehicle and are provided in a vertically rockable manner. The upper and lower arms 41 and 42 are arranged side by side in the vertical direction of the vehicle and extend along the longitudinal direction of the vehicle. The upper and lower arms 41 and 42 are gently inclined so as to be located on the upper side toward the front in a side view. The pair of left and right upper arms 41 are arranged on either side of an upper portion of the supporting member 15, and the pair of left and right lower arms 42 are arranged on either side of a lower portion of the supporting member 15. The rear ends 41b of the pair of left and right upper arms 41 are arranged on either side of an upper portion of the front block 3, and the rear ends 42b of the pair of left and right lower arms 42 are arranged on either side of a lower portion of the front block 3. The rear ends 41b and 42b of the upper and lower arms 41 and 42 are rockably connected to the front block 3. The supporting member 15 is rockably connected to the front ends 41a and 42a of the upper and lower arms 41 and 42.

More specifically, the rear ends 41b and 42b of the upper and lower arms 41 and 42 are rockably connected to the upper and lower connecting portions 3b and 3c of the front block 3 through respective coupling shafts disposed along the vehicle width direction. In FIG. 2, a central axis C14 of the coupling shaft couples the rear end 41b of the upper arm 41 and the upper connecting portion 3b of the front block 3. In FIG. 2, a central axis C15 of the coupling shaft couples the rear end 42b of the lower arm 42 and the lower connecting portion 3c of the front block 3. For example, the rear ends 41b and 42b of the upper and lower arms 41 and 42 are respectively supported rotatably about the central axes C14 and C15 by the upper and lower connecting portions 3b and 3c of the front block 3 through ball bearings, not shown in the figures, or the like.

The upper and lower connecting portions 15c and 15d of the supporting member 15 are rockably connected to the front ends 41a and 42a of the upper and lower arms 41 and 42 through respective coupling shafts disposed along the vehicle width direction. In FIG. 2, a central axis C16 of the coupling shaft couples the upper connecting portion 15c of the supporting member 15 and the front end 41a of the upper arm 41. In FIG. 2, a central axis C17 of the coupling shaft couples the lower connecting portion 15d of the supporting member 15 and the front end 42a of the lower arm 42. For example, the upper and lower connecting portions 15c and 15d of the supporting member 15 are respectively supported rotatably about the central axes C16 and 17 by the front ends 41a and 42a of the upper and lower arms 41 and 42 through ball bearings, not shown in the figures, or the like.

The front and rear ends 41a and 41b of the upper arm 41 is adjacent to the steering axis C2 so as to sandwich the steering axis C2 therebetween. In a side view, the longitudinal length of the upper arm 41 is smaller than that of the lower arm 42. In other words, in a side view, the length of a line segment connecting the central axes C14 and C16 is smaller than that of a line segment connecting the central axes C15 and C17. The rear end 41b (central axis C14) of the upper arm 41 is disposed between the steering axis C2 and a stroke axis C3, to be described later, in a side view. The rear end 41b of the upper arm 41 is disposed in the vicinity of the rear end of the turning member 13. The rear end 42b (central axis C15) of the lower arm 42 is disposed rearwardly of the stroke axis C3, to be described later, in a side view. The rear end 42b of the lower arm 42 is separate from the lower end of the supporting member 15 with the shock absorber member 50 interposed therebetween.

A coupling member 16 coupling the front ends 41a of the pair of left and right upper arms 41 to each other is provided at the front end of the upper arms 41. The coupling member 16 is of rectangular parallelepiped with its length in the vehicle width direction. The pair of left and right upper arms 41 and the coupling member 16 are components made of, for example, aluminum, and are joined to each other by welding. It should be noted that the coupling member 16 may be fastened to the front ends 41a of the pair of left and right upper arms 41 using a fastening member, such a bolt. Also, the coupling member 16 may be hollow.

The lower arm 42 has a triangular shape protruding gently downwardly in a side view. A cross member 45 coupling longitudinal central portions of the pair of left and right lower arms 42 is provided on the protruding side of the lower arms 42. The pair of left and right lower arms 42 and the cross member 45 are components made of, for example, aluminum, and are joined to each other by welding. The cross member 45 extends in the vehicle width direction at the rear of the lower end of the supporting member 15. Both ends in the vehicle width direction of the cross member 45 are joined to the longitudinal intermediate portions of the pair of left and right lower arms 42 on the protruding side.

A recessed portion 45s opening rearwardly and upwardly is formed in a central portion in the vehicle width direction of the cross member 45. The lower end 50b of the shock absorber member 50 is housed in the recessed portion 45s of the cross member 45. Also, a connecting portion 45a to which the lower end 50b of the shock absorber member 50 is connected is formed at a central portion in the vehicle width direction of the cross member 45.

The shock absorber member 50 has a rod type damper 51 inclined so as to be located further rearwardly toward the upper side in a side view, and a coil spring 52 (see FIG. 2) wound around the damper 51. In FIGS. 1 and 3, the coil spring 52 is not shown for the sake of convenience. The shock absorber member 50 expands and contracts by performing a stroke along the central axis C3 thereof, thereby providing a predetermined shock absorbing action. The central axis C3 may hereinafter be referred to as a stroke axis. The stroke axis C3 is disposed further rearwardly than the rear end 41b (central axis C14) of the upper arm 41 in a side view.

A holder 54 for holding a sub-tank 53 of the damper 51 is integrally provided on the upper end 50a of the shock absorber member 50. The sub-tank 53 is provided in a cylindrical shape parallel to the stroke axis on the outer peripheral side of an upper portion of the shock absorber member 50. For example, the sub-tank 53 is a reservoir tank for the shock absorber member 50.

The shock absorber member 50 provides a shock absorbing action by causing the lower end 50b to perform a stroke in accordance with the rocking of the lower arm 42. The shock absorber member 50 is disposed in the rearward and upward direction of the front wheel 9 forwardly of the engine 6 in a side view. The upper portion of the shock absorber member 50 is housed within the lower open portion 3s of the gate shape of the front block 3. The upper end 50a of the shock absorber member 50 is covered with the front block 3 in a side view. The upper end 50a of the shock absorber member 50 is rockably connected to the front block 3 and the lower end 50b of the shock absorber member 50 is rockably connected to the cross member 45.

The upper end 50a of the shock absorber member 50 is rockably connected to the shock absorber connecting portion 3d of the front block 3 through a coupling shaft disposed along the vehicle width direction. In FIG. 2, a central axis C18 of the coupling shaft couples the upper end 50a of the shock absorber member 50 and the shock absorber connecting portion 3d. For example, the upper end 50a of the shock absorber member 50 is supported rotatably about the central axis C18 by the shock absorber connecting portion 3d through a ball bearing, not shown in the figures, or the like.

The lower end 50b of the shock absorber member 50 is rockably connected to the connecting portion 45a of the cross member 45 through a coupling shaft disposed along the vehicle width direction. In FIG. 2, a central axis C19 of the coupling shaft couples the lower end 50b of the shock absorber member 50 and the connecting portion 45a of the cross member 45. For example, the lower end 50b of the shock absorber member 50 is supported rotatably about the central axis C19 by the connecting portion 45a of the cross member 45 through a ball bearing, not shown in the figures, or the like.

Hereinafter, the action of the shock absorber member will be described.

When front wheel braking or the like displaces the front wheel 9 relatively upwardly from a 1G state in which the load of the vehicle weight is applied to the front wheel suspension device 1, the swing arm 40 rocks upwardly. Thus, the front fork 10 and the supporting member 15 are displaced upwardly. At this time, the lower arm 42 rotates backward in a right-handed direction (clockwise direction) in FIG. 2 about the central axis C15. Then, the lower arm 42 displaces the lower end 50b of the shock absorber member 50 upward, and thus compresses the shock absorber member 50.

When the supporting member 15 is displaced upwardly, the turning member 13 is also integrally displaced accordingly. At this time, the link member 30 is displaced with respect to the steering member 25, and the angle of the steering axis C2 to the rotational axis C1 is changed. However, this change is accommodated by the rocking of the ball joints 31j and the rocking of the link member 30.

On the other hand, when acceleration or the like displaces the front wheel 9 relatively downwardly from the 1G state, the swing arm 40 rocks downwardly, and thus the front fork 10 and the supporting member 15 are displaced downwardly. At this time, the lower arm 42 rotates forward in a left-handed direction (counterclockwise direction) in FIG. 2 about the central axis C15. Then, the lower arm 42 displaces the lower end 50b of the shock absorber member 50 downwardly, and thus extends the shock absorber member 50.

When the supporting member 15 is displaced downwardly, the turning member 13 is also integrally displaced accordingly. At this time, the link member 30 is displaced with respect to the steering member 25, and the angle of the steering axis C2 to the rotational axis C1 is changed. However, this change is accommodated by the rocking of the ball joints 31j and the rocking of the link member 30.

As described above, the foregoing embodiment is a front wheel suspension device 1 for a motorcycle. The front wheel suspension device 1 includes a front fork 10 that has a lower end 12b supporting a front wheel 9; a steering member 25 that is rotatably supported by a body frame 2, and rotated about a rotational axis C1 in accordance with operation of a handlebar 20 with a link member 30 that is composed of an upper link 31 and a lower link 32, the upper link 31 having a rear end 31a rockably connected to the steering member 25, the lower link 32 having an upper end 32a rockably connected to a front end 31b of the upper link 31 and a lower end 32b rockably connected to an upper end 11a of the front fork 10. A swing arm 40 includes upper and lower arms 41 and 42 extending in the longitudinal direction of the vehicle and provided in a vertically rockable manner. A supporting member 15 forms a steering axis C2 of the front wheel 9 and rockably supports front ends 41a and 42a of the upper and lower arms 41 and 42, wherein the supporting member 15 is of a cylindrical shape, and supports the front fork 10 on the inside in the radial direction of the supporting member 15 such that the front fork 10 is rotatable about the steering axis C2.

Thus, the supporting member 15 is of a cylindrical shape, and supports the front fork 10 on the inside in the radial direction of the supporting member 15 such that the front fork 10 is rotatable about the steering axis C2. The swing arm 40 and the front fork 10 become less likely to interfere with each other, as compared with the case where the front fork is supported on the outside in the radial direction of the columnar supporting member, resulting in an easy layout of the swing arm 40. Furthermore, the length of the swing arm 40 is more easily ensured as compared with the case where the front fork is supported on the outside in the radial direction of the columnar supporting member. It is therefore possible to ensure the length of the swing arm 40 while improving flexibility in the layout of the swing arm 40. In addition, the vertical distance between the upper and lower arms 41 and 42 is more easily reduced as compared with the case where the front fork is supported on the outside in the radial direction of the columnar supporting member, and therefore the vehicle can be made compact.

In the foregoing embodiment, the supporting member 15 is formed with upper and lower connecting portions 15c and 15d rockably connected to the front ends 41a and 42a of the upper and lower arms 41 and 42, and the upper and lower connecting portions 15c and 15d are arranged further toward the front of the vehicle than the steering axis C2 in a side view. Thus, it is possible to ensure the length of the upper and lower arms 41 and 42 without complicating the supporting member 15.

The steering axis C2 of the front wheel 9 and the rotational axis C1 are offset longitudinally with respect to each other in a side view. Thus, the protrusion of the link member 30 toward the front of the vehicle can be suppressed, thereby allowing a compact steering system.

Furthermore, in the foregoing embodiment, the upper and lower arms 41 and 42 have rear ends 41b and 42b rockably connected to the body frame 2, and the supporting member 15 is rockably connected to the front ends 41a and 42a of the upper and lower arms 41 and 42, wherein it is possible to lower the height of the handlebar 20 while making the layout of the handlebar 20 compact.

The front and rear ends 41a and 41b of the upper arm 41 are adjacent to the steering axis C2 so as to sandwich the steering axis C2 therebetween. Thus, it is possible to ensure the length of the swing arm 40 while bringing the body frame 2 and the steering axis C2 close to each other, and therefore the vehicle can be made compact.

The upper end 50a of the shock absorber member 50 is covered with the body frame 2 in a side view, and the shock absorber member 50 has a central axis C3 (stroke axis) disposed further toward the rear of the vehicle than the rear end 41b of the upper arm 41 in a side view. Thus, since the shock absorber member 50 is disposed rearwardly of the upper arm 41, the upper end 50a of the shock absorber member 50 is concealed behind the body flame 2 in a side view and becomes less likely to be visible from the outside, thereby allowing an improvement in the quality of the appearance.

The handlebar grip portion 21 is disposed between the upper link 31 and the lower link 32 in a side view. Thus, it is possible to make the layout of the handlebar 20 more compact while increasing flexibility in the layout of the handlebar 20, as compared with the case where the handlebar grip portion 21 is disposed above the link member 30 in a side view.

In addition, the layouts of the link member 30, which is a component of the handlebar steering system, and the handlebar 20 can be made compact at the same time. Also, the height of the handlebar 20 can be lowered, as compared with the case where the handlebar grip portion 21 is disposed above the link member 30 in a side view. Also, the increased layout flexibility of the handlebar 20 allows an increase in the flexibility of the setting of riding posture. In addition, in cases where wires are provided to the handlebar 20, the wires can be arranged between the upper and lower links, thereby allowing an increase in the layout flexibility of the wires.

Especially in race vehicles, there are strong demands for lowering the height of the handlebar 20 while making the layout of the handlebar 20 more compact. Therefore the benefits are greater.

Further, since it is possible to suppress a longitudinal circular motion with the center of gravity of the vehicle as a center, so-called pitching, by lowering the height of the handlebar 20, the ground contact pressure on the road surface R is easily ensured and the braking distance can be reduced.

Furthermore, in the foregoing embodiment, the handlebar 20 is formed integrally with the steering member 25. Thus, it is unnecessary to provide a separate member, such as a clamp, for connecting the handlebar 20 and the steering member 25, thereby allowing a reduction in the number of components.

It should be noted that the foregoing embodiment has been described by citing an example in which the handlebar 20 and the steering member 25 are integral with each other. However, the present invention is not limited to this. For example, a separate member, such as a clamp, for connecting the handlebar 20 and the steering member 25, may be provided and the handlebar 20 and the steering member 25 may be fixed by the separate member.

It should be also noted that the foregoing embodiment has been described by citing an example in which the steering axis C2 is separate in a forward direction from the rotational axis C1 in a side view in the 1G state. However, the present invention is not limited to this. For example, the steering axis C2 may be separate in a rearward direction from the rotational axis C1 in a side view. More specifically, the steering axis C2 and the rotational axis C1 should just be offset longitudinally in a side view. Alternatively, the steering axis C2 and the rotational axis C1 may coincide with each other in a side view.

It should be also noted that the foregoing embodiment has been described by citing an example in which the steering axis C2 and the rotational axis C1 are parallel to each other in the 1G state. However, the present invention is not limited to this. For example, the steering axis C2 and the rotational axis C1 may intersect with each other.

It should be understood that the present invention is not limited to the foregoing embodiment and examples of the saddle ride-type vehicle include general vehicles in which a rider sits astride a vehicle body, and include not only motorcycles (including motor-assisted bicycles and scooter-type vehicles), but also three-wheeled vehicles (including vehicles having one wheel in front and two in the rear, as well as vehicles having two wheels in front and one in the rear).

It should be also understood that the constitution according to the foregoing embodiment is only illustrative of the present invention, and various changes, such as replacement of the elements in the embodiment by known elements, may be made without departing from the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front wheel suspension device for a saddle-ride vehicle, comprising:
    a front fork including a lower end supporting a front wheel;
    a steering member rotatably supported by a body frame, and being rotated about a rotational axis in accordance with operation of a handlebar;
    a link member composed of an upper link and a lower link, the upper link having a first end rockably connected to the steering member, the lower link having an upper portion rockably connected to a second end of the upper link and a lower portion rockably connected to an upper end of the front fork;
    a swing arm having upper and lower arms extending in a longitudinal direction of the vehicle and provided in a vertically rockable manner; and
    a supporting member for forming a steering axis of the front wheel and rockably supporting front ends of the upper and lower arms,
    wherein the supporting member includes a lower connecting portion on the supporting member rockably connected to the front end of the lower arm,
    wherein the lower connecting portion is arranged further toward a front of the vehicle than the steering axis in a side view,
    wherein the supporting member is of a cylindrical shape, and supports the front fork on an inside in a radial direction of the supporting member such that the front fork is rotatable about the steering axis,
    wherein the steering member has a main body, and a connecting portion extending forwardly from the main body, and
    wherein the first end of the upper link is connected to the connecting portion by a pivotal connection having only one degree of rotational freedom.

2. The front wheel suspension device for a saddle-ride vehicle according to claim 1, wherein:
    the supporting member includes an upper connecting portion rockably connected to the front end of the upper arm; and
    the upper connecting portion is arranged further toward the front of the vehicle than the steering axis in a side view.

3. The front wheel suspension device for a saddle-ride vehicle according to claim 2, wherein the steering axis of the front wheel and the rotational axis are offset longitudinally with respect to each other in a side view.

4. The front wheel suspension device for a saddle-ride vehicle according to claim 2, wherein:
    the upper and lower arms have rear ends rockably connected to the body frame.

5. The front wheel suspension device for a saddle-ride vehicle according to claim 2, wherein the front end of the upper arm and the rear end of the upper arm are adjacent to the steering axis so as to sandwich the steering axis therebetween.

6. The front wheel suspension device for a saddle-ride vehicle according to claim 2, further comprising:
    a shock absorber member including an upper end rockably connected to the body frame and a lower end rockably connected to the lower arm;
    wherein the upper end of the shock absorber member is covered with the body frame in a side view; and
    the shock absorber member has a central axis disposed further toward a rear of the vehicle than a rear end of the upper arm in a side view.

7. The front wheel suspension device for a saddle-ride vehicle according to claim 1, wherein the steering axis of the front wheel and the rotational axis are offset longitudinally with respect to each other in a side view.

8. The front wheel suspension device for a saddle-ride vehicle according to claim 7, wherein:
the upper and lower arms have rear ends rockably connected to the body frame; and
the supporting member is rockably connected to the front end of the upper arm.

9. The front wheel suspension device for a saddle-ride vehicle according to claim 7, wherein the front end of the upper arm and the rear end of the upper arm are adjacent to the steering axis so as to sandwich the steering axis therebetween.

10. The front wheel suspension device for a saddle-ride vehicle according to claim 7, further comprising:
a shock absorber member including an upper end rockably connected to the body frame and a lower end rockably connected to the lower arm,
wherein the upper end of the shock absorber member is covered with the body frame in a side view, and
wherein the shock absorber member has a central axis disposed further toward a rear of the vehicle than a rear end of the upper arm in a side view.

11. The front wheel suspension device for a saddle-ride vehicle according to claim 1, wherein:
the upper and lower arms have rear ends rockably connected to the body frame; and
the supporting member is rockably connected to the front end of the upper arm.

12. The front wheel suspension device for a saddle-ride vehicle according to claim 11, wherein the front end of the upper arm and the rear end of the upper arm are adjacent to the steering axis so as to sandwich the steering axis therebetween.

13. The front wheel suspension device for a saddle-ride vehicle according to claim 1, wherein the front end of the upper arm and the rear end of the upper arm are adjacent to the steering axis so as to sandwich the steering axis therebetween.

14. A front wheel suspension device for a saddle-ride vehicle, comprising:
a steering member rotatably supported by a body frame;
a handlebar operatively connected to said steering member, said steering member being rotated about a rotational axis in accordance with operation of the handlebar;
a link member composed of an upper link and a lower link, the upper link having a first end rockably connected to the steering member, the lower link having an upper portion rockably connected to a second end of the upper link and a lower portion rockably connected to an upper end of a front fork;
a swing arm having upper and lower arms extending in a longitudinal direction of the vehicle and provided in a vertically rockable manner; and
a supporting member for forming a steering axis of a front wheel and rockably supporting front ends of the upper and lower arms,
wherein the supporting member includes a lower connecting portion rockably connected to the front end of the lower arm,
wherein the lower connecting portion is arranged further toward a front of the vehicle than the steering axis in a side view,
wherein the supporting member is of a cylindrical shape, and supports the front fork on an inside in a radial direction of the supporting member such that the front fork is rotatable about the steering axis,
wherein the steering member has a main body, and a connecting portion extending forwardly from the main body, and
wherein the first end of the upper link is connected to the connecting portion by a pivotal connection having only one degree of rotational freedom.

15. The front wheel suspension device for a saddle-ride vehicle according to claim 1, further comprising:
a shock absorber member including an upper end rockably connected to the body frame and a lower end rockably connected to the lower arm,
wherein the upper end of the shock absorber member is covered with the body frame in a side view, and
wherein the shock absorber member has a central axis disposed further toward a rear of the vehicle than a rear end of the upper arm in a side view.

16. The front wheel suspension device for a saddle-ride vehicle according to claim 14, wherein:
the supporting member includes an upper connecting portion rockably connected to the front end of the upper arm; and
the upper connecting portion is arranged further toward the front of the vehicle than the steering axis in a side view.

17. The front wheel suspension device for a saddle-ride vehicle according to claim 14, wherein the steering axis of the front wheel and the rotational axis are offset longitudinally with respect to each other in a side view.

18. The front wheel suspension device for a saddle-ride vehicle according to claim 14, wherein:
the upper and lower arms have rear ends rockably connected to the body frame; and
the supporting member is rockably connected to the front end of the upper arm.

19. The front wheel suspension device for a saddle-ride vehicle according to claim 14, wherein the front end of the upper arm and the rear end of the upper arm are adjacent to the steering axis so as to sandwich the steering axis therebetween.

20. The front wheel suspension device for a saddle-ride vehicle according to claim 14, further comprising:
a shock absorber member including an upper end rockably connected to the body frame and a lower end rockably connected to the lower arm,
wherein the upper end of the shock absorber member is covered with the body frame in a side view, and
wherein the shock absorber member has a central axis disposed further toward the rear of the vehicle than the rear end of the upper arm in a side view.

* * * * *